US010400913B2

(12) United States Patent
Konishi et al.

(10) Patent No.: US 10,400,913 B2
(45) Date of Patent: Sep. 3, 2019

(54) RAPID-CONNECT COUPLER WITH A PRODUCT FLOW RESTRICTOR

(71) Applicant: Engineered Controls International, LLC, Elon, NC (US)

(72) Inventors: Howard M. Konishi, Redmond, WA (US); Ronald J. Johnston, Wellington, OH (US)

(73) Assignee: Engineered Controls International, LLC, Elon, NC (US)

( * ) Notice: Subject to any disclaimer, the term of this patent is extended or adjusted under 35 U.S.C. 154(b) by 124 days.

(21) Appl. No.: 15/140,062

(22) Filed: Apr. 27, 2016

(65) Prior Publication Data

US 2016/0312915 A1    Oct. 27, 2016

Related U.S. Application Data

(60) Provisional application No. 62/153,402, filed on Apr. 27, 2015.

(51) Int. Cl.
| | |
|---|---|
| *F16K 1/12* | (2006.01) |
| *F16K 31/60* | (2006.01) |
| *F16K 35/02* | (2006.01) |
| *F16L 15/00* | (2006.01) |
| *F16L 37/12* | (2006.01) |

(Continued)

(52) U.S. Cl.
CPC .............. *F16K 35/025* (2013.01); *F16K 1/12* (2013.01); *F16K 31/602* (2013.01); *F16L 15/00* (2013.01); *F16L 37/127* (2013.01); *F16L 37/1215* (2013.01); *F16L 37/24* (2013.01); *F16L 37/407* (2013.01); *F16L 37/47* (2013.01)

(58) Field of Classification Search
None
See application file for complete search history.

(56) References Cited

U.S. PATENT DOCUMENTS

| 2,070,013 A | 2/1937 | Krannak |
| 2,259,137 A | 10/1941 | Iftiger, Sr. |

(Continued)

FOREIGN PATENT DOCUMENTS

| CN | 1608910 | 4/2005 |
| DE | 9204384 | 7/1992 |

(Continued)

OTHER PUBLICATIONS

International Search Report and Written Opinion for PCT/US2016/029550 dated Dec. 15, 2016.

*Primary Examiner* — Jessica Cahill
*Assistant Examiner* — Daphne M Barry
(74) *Attorney, Agent, or Firm* — Neal, Gerber & Eisenberg LLP (57) ABSTRACT

A rapid-connect coupler includes: an end fitting for conveying a fluid stream; a probe for conveying the fluid stream; a valve configured to occupy a closed position blocking fluid communication between the probe and the end fitting and an open position enabling fluid communication between the probe and the end fitting; a handle configured to actuate the valve between the closed and open positions; a sleeve moveable between a first sleeve position and a second sleeve position. The sleeve, in the first sleeve position, is configured to prevent the handle from actuating the valve from the closed position to the open position.

20 Claims, 11 Drawing Sheets (51) Int. Cl.
*F16L 37/24* (2006.01)
*F16L 37/47* (2006.01)
*F16L 37/127* (2006.01)
*F16L 37/407* (2006.01)

(56) References Cited

U.S. PATENT DOCUMENTS

| | | |
|---|---|---|
| 2,327,714 A | 8/1943 | Iftiger, Sr. |
| 2,388,179 A | 10/1945 | Prowd |
| 2,434,167 A | 1/1948 | Knoblauch |
| 2,552,543 A | 5/1951 | Earle et al. |
| 2,797,110 A | 6/1957 | Covington |
| 3,674,051 A | 7/1972 | Stratman |
| 3,757,836 A | 9/1973 | Masuda |
| 3,924,654 A | 12/1975 | Buller et al. |
| 4,303,098 A | 12/1981 | Shindelar |
| 4,398,561 A | 8/1983 | Maldavs |
| 4,543,995 A | 10/1985 | Weh et al. |
| 4,676,269 A | 6/1987 | Sarson |
| 4,716,938 A | 1/1988 | Weh et al. |
| 4,884,830 A | 12/1989 | Meisinger |
| 5,080,132 A | 1/1992 | Manz et al. |
| 5,139,049 A | 8/1992 | Jensen et al. |
| 5,211,197 A | 5/1993 | Marrison et al. |
| 5,255,714 A | 10/1993 | Mullins |
| 5,265,844 A | 11/1993 | Westfall |
| 5,293,902 A | 3/1994 | Lapierie |
| 5,339,862 A | 8/1994 | Haunhorst |
| 5,439,258 A | 8/1995 | Yates |
| 5,547,166 A | 8/1996 | Engdahl |
| 5,564,471 A | 10/1996 | Wilder et al. |
| 5,575,510 A * | 11/1996 | Weh ............... F16L 37/1215 285/312 |
| 5,577,706 A | 11/1996 | King |
| 5,580,099 A | 12/1996 | Eaton |
| 5,603,353 A | 2/1997 | Clark et al. |
| 5,649,723 A | 7/1997 | Larsson |
| 5,706,967 A | 1/1998 | Weh et al. |
| 5,788,443 A | 8/1998 | Cabahug |
| 5,927,683 A | 7/1999 | Weh et al. |
| 5,950,679 A | 9/1999 | Danielson et al. |
| 5,984,265 A | 11/1999 | Engdahl |
| 5,988,697 A | 11/1999 | Arosio |
| 6,035,894 A | 3/2000 | Weh et al. |
| 6,039,303 A | 3/2000 | Danielson et al. |
| 6,073,971 A | 6/2000 | Weh et al. |
| 6,073,974 A | 6/2000 | Meisinger et al. |
| 6,082,399 A | 7/2000 | Nyberg |
| 6,152,496 A | 11/2000 | Kouda |
| 6,257,278 B1 | 7/2001 | Danielson et al. |
| 6,279,874 B1 | 8/2001 | Nyberg |
| 6,343,630 B1 * | 2/2002 | Dubinsky ........... F16L 37/0848 137/614.05 |
| 6,375,152 B1 | 4/2002 | Weh et al. |
| 6,398,268 B1 * | 6/2002 | Takahashi ........... F16L 37/1215 285/305 |
| 6,637,460 B2 | 10/2003 | Haunhorst |
| 7,073,773 B2 | 7/2006 | Nuttall et al. |
| 7,497,231 B2 * | 3/2009 | Sasa .................... F16L 37/0848 137/614.05 |
| 7,568,737 B2 | 8/2009 | Wells et al. |
| 7,841,580 B2 | 11/2010 | Konishi et al. |
| 8,844,979 B2 * | 9/2014 | Danielson ........... F16L 37/1215 137/798 |
| 9,115,838 B2 | 8/2015 | Konishi |
| 2006/0118184 A1 | 6/2006 | Mikiya et al. |
| 2007/0001143 A1 | 1/2007 | Konishi et al. |
| 2008/0011369 A1 | 1/2008 | Matsumoto |
| 2008/0185837 A1 | 8/2008 | Danielson |
| 2009/0140519 A1 | 6/2009 | Pavnaskar et al. |
| 2009/0165870 A1 | 7/2009 | Konishi |
| 2010/0148499 A1 | 6/2010 | Le Quere |
| 2012/0037247 A1 * | 2/2012 | Konishi ................. F16L 37/23 137/515.5 |
| 2012/0090713 A1 * | 4/2012 | Cooley ................ E02F 9/2275 137/798 |

FOREIGN PATENT DOCUMENTS

| | | |
|---|---|---|
| EP | 0754899 | 1/1997 |
| EP | 1811222 | 7/2007 |
| WO | WO 2013059748 | 4/2013 |

* cited by examiner

RAPID-CONNECT COUPLER WITH A PRODUCT FLOW RESTRICTOR

CROSS REFERENCE

This patent application claims priority to U.S. Provisional Application No. 62/153,402, filed on Apr. 27, 2015, the contents of which are hereby incorporated by reference in their entirety.

BACKGROUND

This disclosure relates to rapid connect couplers configured to provide a fast coupling capability with a receptacle such as a compressed gas cylinder. During the receptacle refilling process, it is preferable to ensure the rapid connect coupler is securely attached to the receptacle before enabling flow of fluid or product from a fluid source, through the coupler, and into the receptacle.

SUMMARY

This application is defined by the appended claims. The description summarizes aspects of the embodiments and should not be used to limit the claims. Other implementations are contemplated in accordance with the techniques described herein, as will be apparent upon examination of the following drawings and detailed description, and such implementations are intended to be within the scope of this application.

The present disclosure relates to a rapid-connect coupler including: an end fitting for conveying a fluid stream; a probe for conveying the fluid stream; a valve configured to occupy a closed position blocking fluid communication between the probe and the end fitting and an open position enabling fluid communication between the probe and the end fitting; a handle configured to actuate the valve between the closed and open positions; a sleeve moveable between a first sleeve position and a second sleeve position. The sleeve, in the first sleeve position, is configured to prevent the handle from actuating the valve from the closed position to the open position.

The present disclosure also relates to a rapid-connect coupler including: a probe for conveying a fluid stream; a sleeve moveable between a first sleeve position and a second sleeve position. The sleeve, in the first sleeve position, is configured to prevent the probe from conveying the stream of fluid.

The present disclosure further relates to A coupler including: a hollow probe for conveying a fluid stream; a first rod configured to longitudinally translate within the hollow probe; a second rod joined to the first rod, the second rod protruding out of the probe; a rod spring configured to bias the first rod to an extended position; a pin joined to the first rod and configured to slide in a groove defined in a housing, wherein the groove has an end configured to catch the pin and arrest the longitudinal translation of the first rod.

DETAILED DESCRIPTION

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein.

Figure 1:
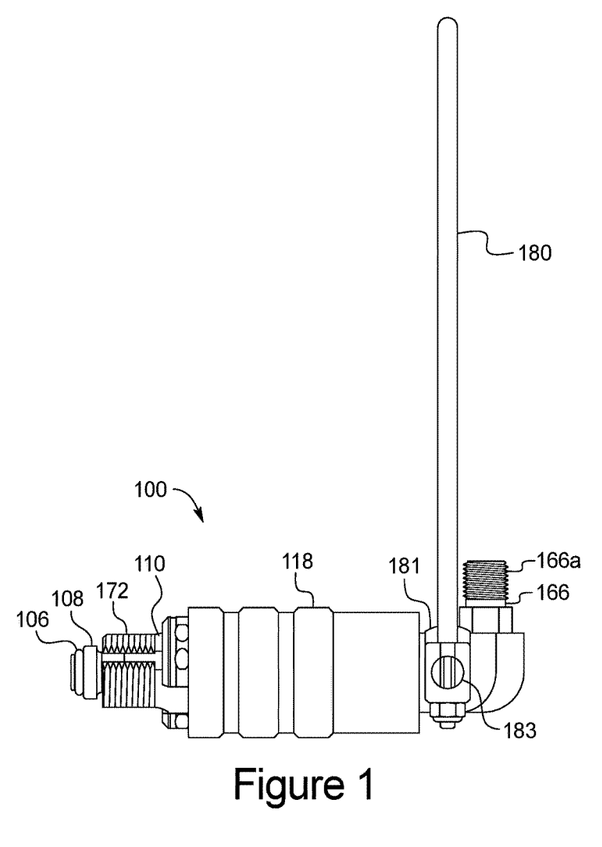
FIG. 1 is a side view of a rapid connect coupler.
Figure 2:
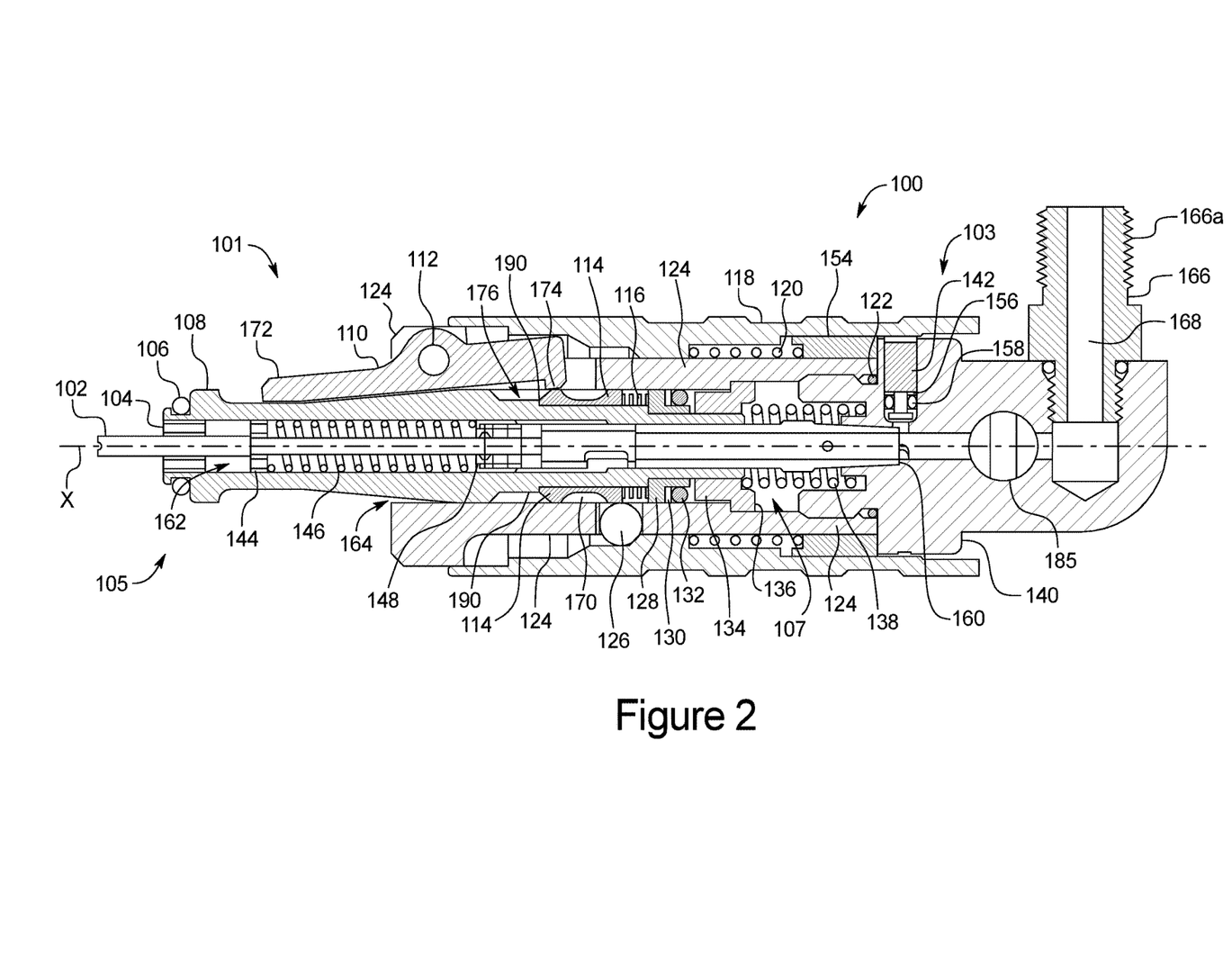
FIG. 2 is a cross sectional side view of a first embodiment of the rapid connect coupler.
Figure 4:
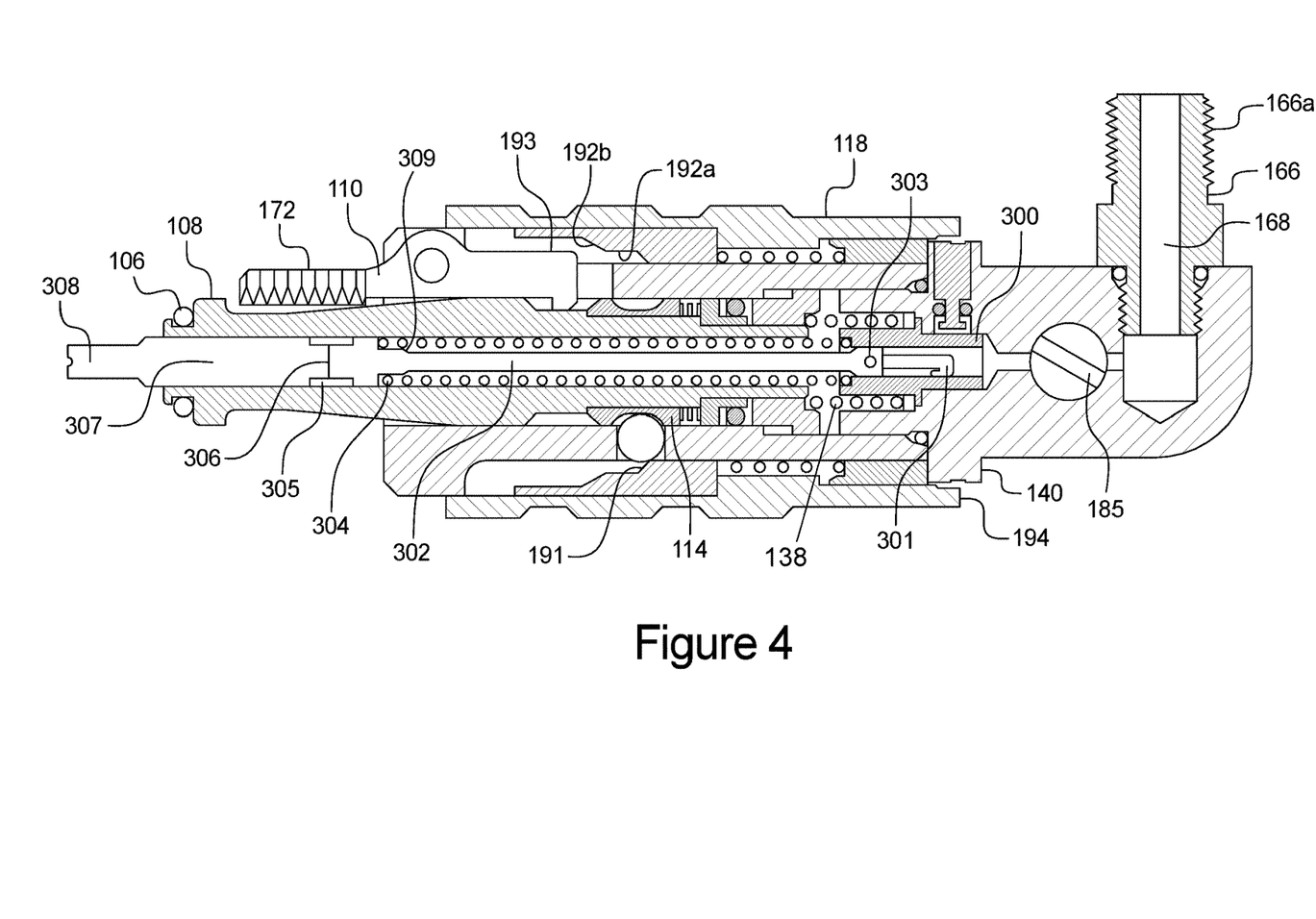
FIG. 4 is a cross sectional side view of a second embodiment of the rapid connect coupler.

FIG. 2 is a cross section of a first embodiment of the rapid connect coupler 100 disclosed herein. FIG. 4 is a cross section of a second embodiment of the rapid connect coupler 100 disclosed herein. It should be appreciated that the first embodiment and the second embodiment are similar except for the differences discussed below. It should be appreciated that the general operation of the first embodiment is the same as the general operation of the second embodiment, except as discussed below. It should therefore be appreciated that all disclosure related to the first embodiment applies to the second embodiment, except where such disclosure is inconsistent with the elements of the second embodiment, as discussed below. It should thus be appreciated that Figures related to the first embodiment are relevant to the second embodiment and that Figures related to the second embodiment are relevant to the first embodiment.

The general operation of rapid connector coupler 100 will now be described. Rapid connect coupler 100 of the present disclosure includes a sleeve 118 longitudinally slideable along a housing 124, a probe 108 longitudinally slideable within housing 124, one or more latch segments 110, one or more spherical balls or retaining members 126, and a ball seat 114. Ball seat 114 fits against an outer circumference of probe 108, but is not fixed or permanently joined to probe 108. Rapid connect coupler 100 also includes a rotatable flow restriction chamber or valve 185 joined to flow restrictor handle 180 via one or more pins 183. Flow restrictor handle 180 includes abutment members 181 and 182.

Figure 10:
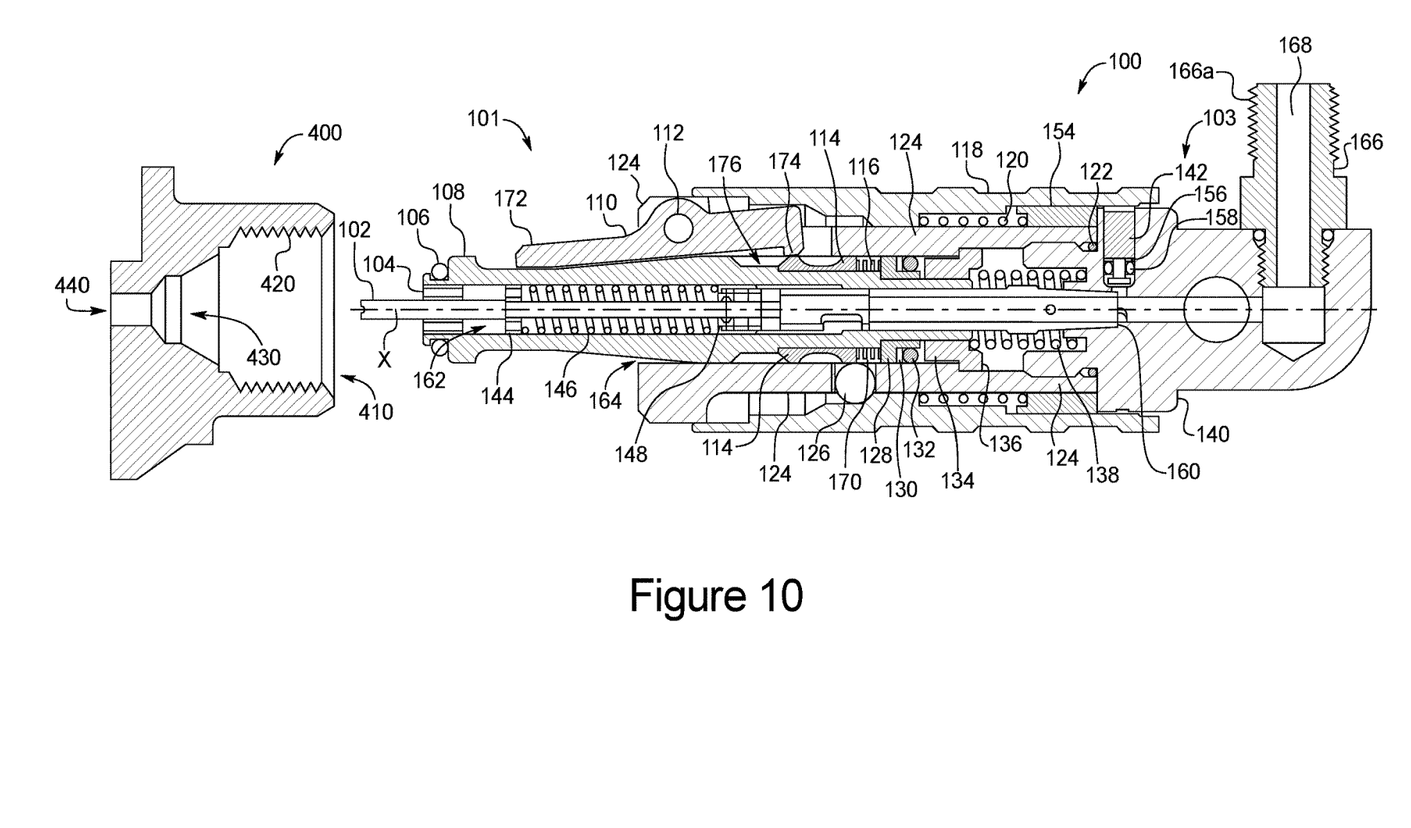
FIG. 10 is a cross sectional side view of the first embodiment of the rapid coupler and an exemplary receptacle.

As shown in FIG. 10, a user inserts probe 108 into a refillable receptacle 400. Eventually, probe 108 contacts (i.e., presses against) internal features of the receptacle 400. For example, a front guide 104 of probe 108 may contact an internal feature of receptacle 400 and/or a sealing ring 106 of the probe may contact an internal feature of receptacle 400.

Upon contact, receptacle 400 transmits a counter-force through probe 108 that enables probe 108 to retract with respect to sleeve 118, latch segments 110, and housing 124. More specifically, the counter-force of the receptacle 400 opposes counter-biasing compressive forces of seat spring 116 and terminal probe spring 138. During this process, probe 108 remains in contact with receptacle 400.

When the counter-force of the receptacle 400 is absent (i.e., coupler 100 is not in contact with receptacle 400), seat spring 116 and probe spring 138 bias probe 108 to longitudinally extend with respect to sleeve 118, latch segments 110, and housing 124. With respect to FIGS. 2 and 10, probe 108 "retracts" by longitudinally sliding toward the right side of the page. Probe 108 "extends" by longitudinally sliding toward the left side of the page.

As shown in FIG. 2, ball seat 114 is fitted against and wraps around an outer circumference of probe 108. Probe 108 includes a shoulder 190 configured to contact a front surface of ball seat 114. As the probe 108 retreats into the housing 124, shoulder 190 applies force to ball seat 114 via the front surface of ball seat 114. This force enables ball seat 114 to oppose the compressive force of seat spring 116 and follow the retraction of probe 108.

Sleeve 118 is biased toward the longitudinally extended position by sleeve spring 120. In the context of FIG. 2, this means that sleeve 118 is biased toward the left side of the page. One or more spherical balls or retaining members 126 oppose the biasing force of sleeve spring 120 and keep sleeve 118 at rest. When spherical balls or retaining members 126 perform this function, they occupy a blocking position.

Ball seat 114 defines one or more ball cavities 170. Each ball cavity 170 is sized to accommodate a portion of each spherical ball 126. When ball seat 114 retracts a predetermined length, spherical balls or retaining members 126 move inwards (i.e., toward the X axis of FIG. 2) and occupy their respective ball cavities 170. More specifically, a slanted inner surface 191 of sleeve 118 contacts spherical balls or retaining members 126. Slanted inner surface 191 of sleeve 118 pushes each spherical ball 126 in the radially inward direction due to compressive force from sleeve spring 120.

When ball seat 114 is out of position (i.e., ball cavities 170 defined in ball seat 114 are misaligned with spherical balls or retaining members 126), spherical balls or retaining members 126 lack space to move and occupy the blocking position. In the blocking position, spherical balls or retaining members 126 oppose the force from slanted inner surface 191 of the sleeve 118, keeping the sleeve 118 at rest.

Figure 6:
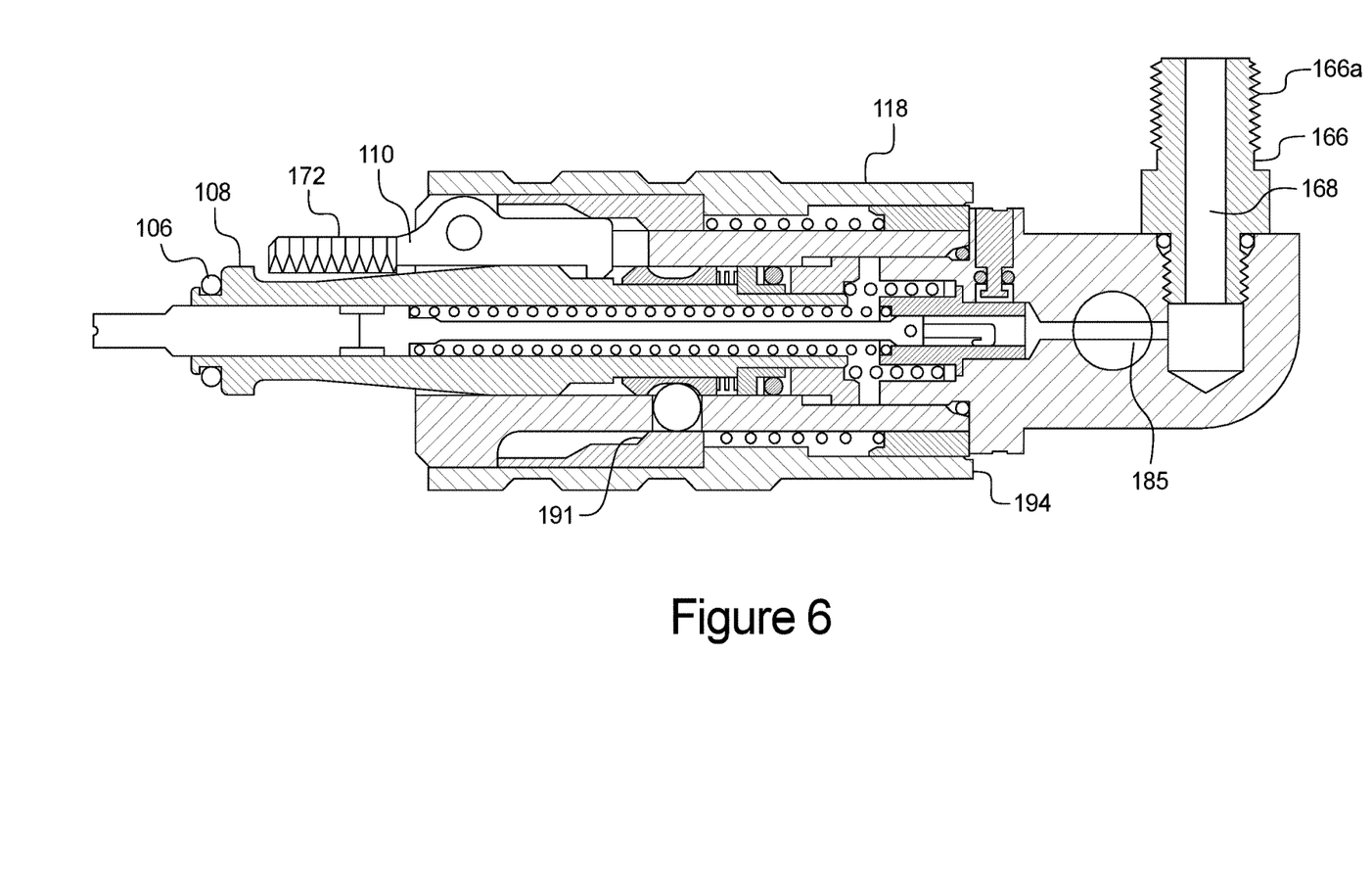
FIG. 6 is a cross sectional side view of the second embodiment of the rapid connect coupler.

When the ball seat 114 is in position (i.e., the ball cavities 170 line up with spherical balls or retaining members 126), slanted inner surface 191 pushes spherical balls or retaining members 126 inwards until the spherical balls or retaining members 126 no longer contact the slanted inner surface 191, as shown in FIG. 6. Spherical balls or retaining members 126 now occupy a clearance position and enable longitudinal translation of sleeve 118.

As shown in FIG. 2, latch segments 110 each includes a latch lip 174 biased outward by ball seat 114. Because latch segments 110 pivot about latch pins 112, when latch lips 174 are biased outwards, latch noses 172 are biased inwards, toward the probe 108. This is called a retracted latch position. When the ball seat 114 retracts, latch lips 174 are no longer biased outwards and are free to rotate to an extended latch position shown in FIG. 4. Eventually, as discussed below, sleeve 118 forces the latch lips 174 into the extended latch position.

When spherical balls or retaining members 126 occupy ball cavities 170 defined in ball seat 114 (i.e., spherical balls or retaining members 126 are in the clearance position), sleeve 118 longitudinally extends or translates toward the receptacle 400 due to force exerted by sleeve spring 120.

Sleeve 118 includes inner surfaces 192*a* and 192*b* (see FIG. 4) configured to contact or press against outer surfaces 193 of the latch segments 110. Inner surfaces 192*a* and 192*b* slide over outer surfaces 193 of latch segments 110, forcing latch segments 110 into the extended latch positions of FIG. 6. As stated above, in the extended latch positions, the latch lips 174 of each latch segment 110 are pressed radially inwardly toward probe 108 and the latch noses 172 of each latch segment 110 are forced radially outward.

As shown in FIG. 4, latch noses 172 define an outer helical threaded profile. The outer helical threaded profile matches an inner threaded portion 420 of receptacle 400. When the sleeve 118 forces latch noses 172 into the position of FIG. 6, latch noses 172 engage inner threaded portion 420 of the receptacle 400, binding the coupler 100 to the receptacle 400. No twisting or screwing of latch noses 172 into inner threaded portion 420 is required. The latch noses 172 remain fully engaged with inner threaded portion 420 of the receptacle 400 until sleeve 118 retracts and inner surfaces 192*a* and 192*b* of the sleeve 118 no longer firmly contact outer surfaces 193 of the latch segments 110.

Figure 5:
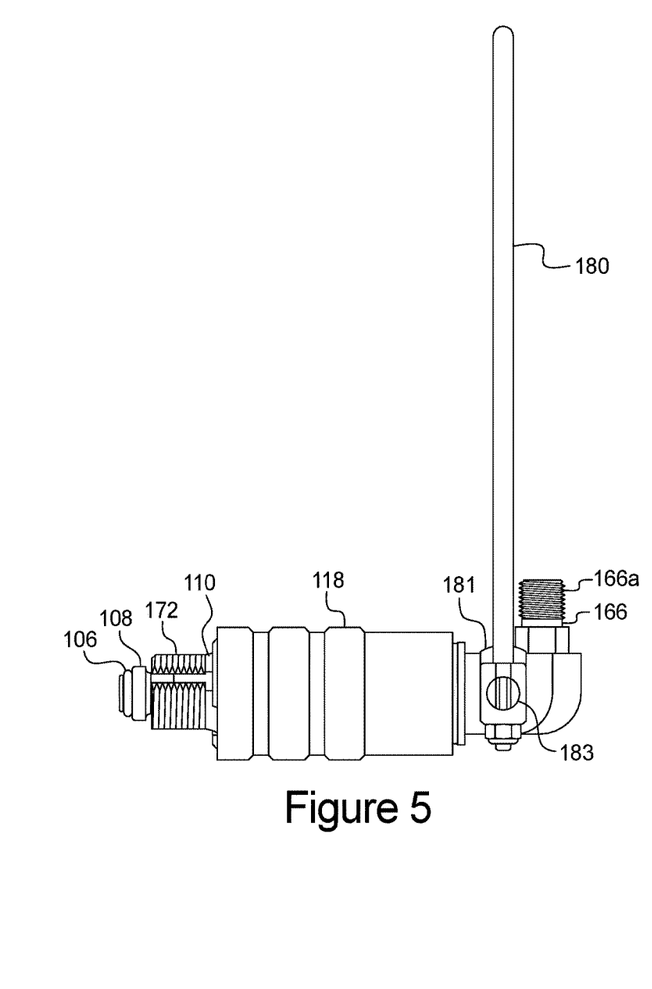
FIG. 5 is a side view of the rapid connect coupler of FIG. 1.

Handle 180 rotates or actuates flow restriction chamber or valve 185 via pins 183 and 184. When handle 180 is in a vertical position (shown in FIG. 5), flow restriction chamber or valve 185 is closed (shown in FIG. 2). When handle 180 is in a slanted position (shown in FIG. 3), flow restriction chamber or valve 185 is closed (shown in FIG. 4). When the handle 180 is in a horizontal position (shown in FIG. 7), flow restriction chamber or valve 185 is open (shown in FIG. 6).

As discussed below, sleeve 118 serves as a safety feature that prevents the handle 180 from reaching the horizontal position (and thus opening the flow restriction chamber or valve 185) before threaded latch noses 172 have engaged threaded portion 420 of receptacle 400.

More specifically, sleeve 118 includes a rear surface 194. When sleeve 118 is retracted (i.e., in the first sleeve position of FIG. 2 where sleeve 118 is held in place via spherical balls or retaining members 126), rear surface 194 is configured to contact abutment members 181 and 182 of handle 180 as shown in FIG. 8. More specifically, rear surface 194 is configured to interfere with the rotational path of abutment members 181 and 182 and thereby prevent handle 180 from rotating more than a nominal degree. See FIG. 8. Put differently, when sleeve 118 is retracted, rear surface 194 of sleeve 118 is configured to block handle 180 from reaching the horizontal position of FIG. 7.

Figure 3:
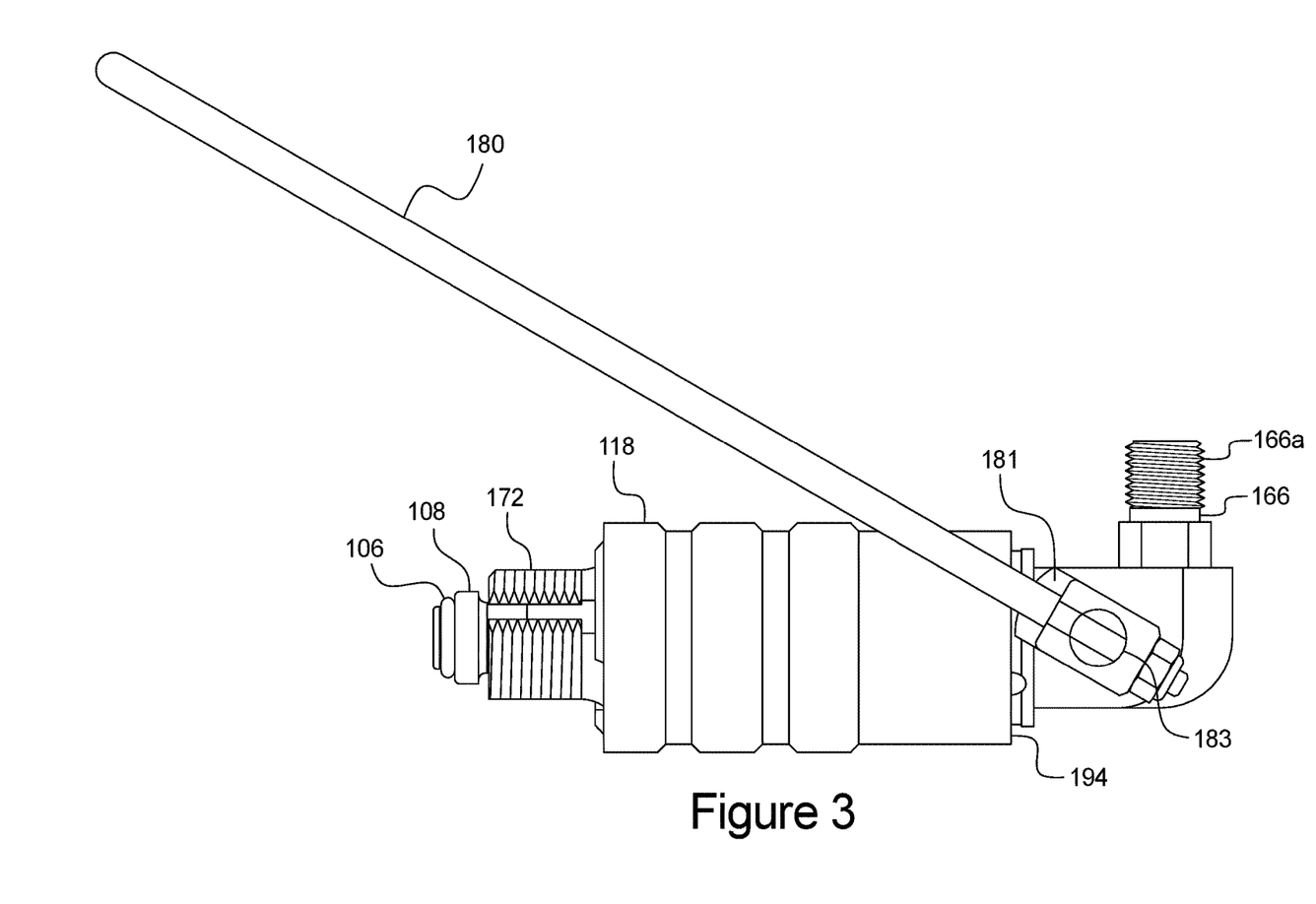
FIG. 3 is a side view of the rapid connect coupler of FIG. 1.

When sleeve 118 is partially retracted and partially extended as shown in FIG. 3, the rear surface 194 of sleeve 118 is still configured to interfere with or block abutment members 181 and 182 of handle 180. When sleeve 118 is partially retracted, rear surface 194 of sleeve 118 thus prevents handle 180 from rotating forward and reaching the horizontal position of FIG. 7.

Figure 7:
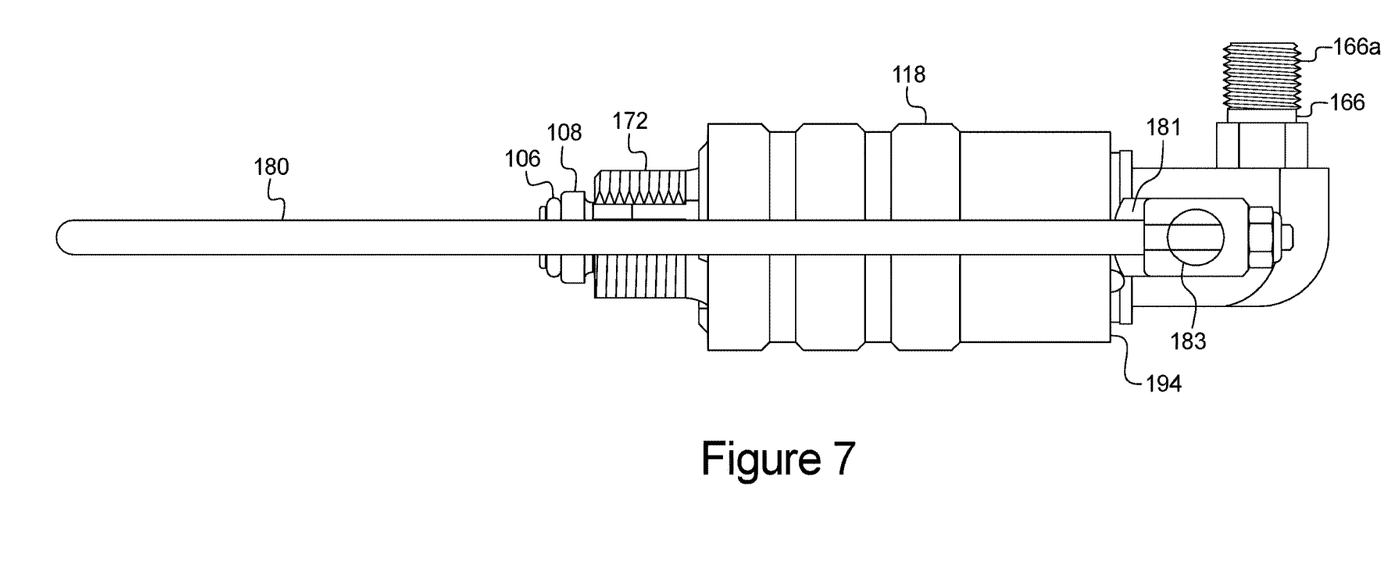
FIG. 7 is a side view of the rapid connect coupler of FIG. 1.
Figure 8:
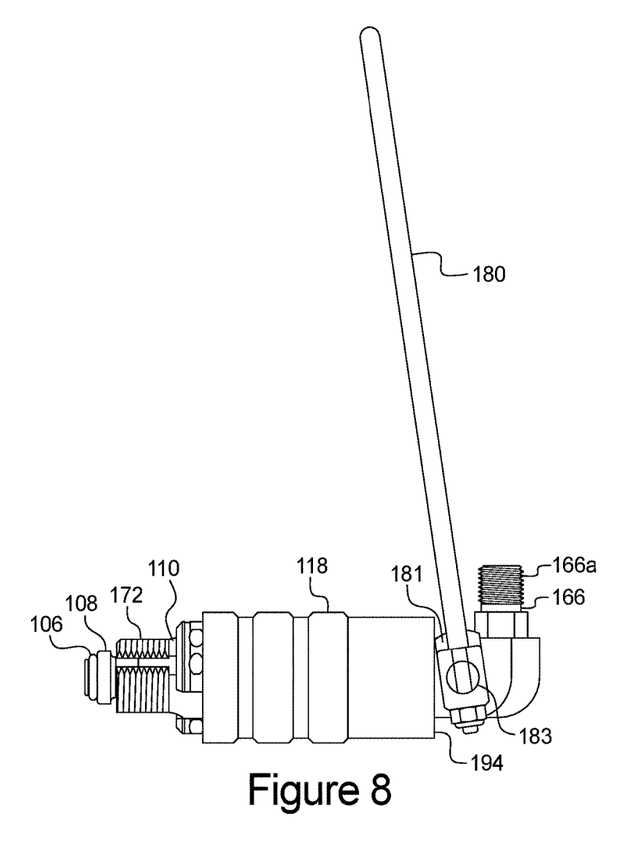
FIG. 8 is a side view of the rapid connect coupler of FIG. 1.

When sleeve 118 is fully extended (i.e., in a second sleeve position) as shown in FIGS. 6 and 7, rear surface 194 of sleeve 118 is clear of the rotational path of abutment members 181 and 182. A user may now rotate handle 180 into the horizontal position of FIGS. 6 and 7 to open the flow restriction chamber or valve 185.

Features of rapid connect coupler 100 are further discussed below. Some of the disclosure below repeats features discussed above for context. Rapid-connect coupler 100 includes a housing 124 having a first housing end 101 and a second housing end 103. An interior of housing 124 defines, at least in part, a probe cavity 164. Rapid-connect coupler 100 also includes probe 108 having a probe front end 105 and a probe back end 107, where probe front end 105 is configured to extend out of probe cavity 164 and probe 108 is configured to slidably translate within probe cavity 164. Probe 108 translates within the probe cavity 164 to engage receptacle 400 (FIG. 10), by causing latch segments 110 to securely latch and couple with threaded portion 420 of the refillable receptacle 400. Certain portions of the coupler 100 are similar to those disclosed in U.S. Pat. No. 9,115,838, which is hereby incorporated by reference in its entirety.

Rapid-connect coupler 100 includes a fluid passageway 162 defined by an interior of probe 108 and/or housing 124. Fluid passageway 162 is configured to communicate product (i.e., fluid) such as a gas or liquid from second housing end 103 through to probe front end 105. Latch segments 110 are pivotally coupled to the housing 124 via latch pins 112. Each latch segment 110 includes a latch nose 172 and a latch lip 174. Rapid connect coupler 100 may include a total of three latch segments 110.

Sleeve 118 is configured to longitudinally translate with respect to housing 124, probe 108, end fitting 140, and/or one or more latch segments 110. Sleeve spring 120 biasing sleeve 118 along the X-axis. Sleeve spring 120 rests against a spring pad 154, which rests against the end fitting 140.

Rapid-connect coupler 100 includes ball seat 114 surrounding a portion of probe 108 within probe cavity 164. Seat spring 116 biases ball seat 114 toward probe front end 105. Ball seat 114 defines a ball cavity 170 configured to accept the one or more spherical balls or retaining members 126.

Probe packing or sealing ring 106 sits at first housing end 101. Probe packing or sealing ring 106 is a compressible sealing ring for sealing a connection between rapid-connect coupler 100 and, for example, refillable receptacle 400. Probe packing or sealing ring 106 compresses between probe 108 and an inner feature of receptacle 400. Probe packing or sealing ring 106 prevents fluid or product from leaking out of probe 108, past threads 420, and into atmosphere. As previously noted, probe 108 includes fluid passageway 162 at first housing end 101 that extends through probe 108 along the x-axis.

A tip 102 slideably resides within fluid passageway 162 extending along the x-axis, and is centered into the proper radial position via the front guide 104, a washer 144, and a spring pad 148. Spring pad 148 is a solid member that interfaces with tip spring 146 to position and load the tip spring 146 for biasing. Washer 144 is fixed to the tip 102. Tip spring 146 biases tip 102 to the longitudinally extended position by exerting a compressive force against washer 144. In some embodiments, tip 102 is hollow and therefore contributes to the supply of fluid or product into receptacle 400. In preferred embodiments, tip 102 is solid (i.e., not hollow) and does not carry any fluid or product.

Probe 108 includes seat spring 116, a seat 128, a backup ring 130, a rear probe packing 132, a lock ring packing 134, and a lock ring 136. Rear probe packing 132 provides a seal to stop external leakage. Seat 128 and backup ring 130 aid in supporting rear probe packing 132. Lock ring packing 134 and lock ring 136 assist in positioning rear probe packing 132.

Probe back end 107 surrounds a tube 160 and contacts terminal probe spring 138. Terminal probe spring 138 biases probe 108 towards the longitudinally extended position. Second housing end 103 includes an end fitting 140 housing tube 160 and supporting terminal probe spring 138. End fitting packing 122 resides between housing 124 and end fitting 140 to provide a leakage seal.

End fitting 140 also includes a plunger 142 (there can be multiple plungers 142), which includes plunger packing 158 and a plunger-backup ring 156. When an inner radial end of plunger 142 is pressurized, plunger 142 radially protrudes out of end fitting 140 to provide a hard stop for sleeve 118. With reference to FIG. 6, when sleeve 118 is in the fully longitudinally extended position and fluid passes through flow restriction chamber or valve 185, fluid pressurizes the inner radial end of plunger 142, causing plunger 142 to protrude from end fitting 140 and provide a hard back-stop for sleeve 118 (not shown). Now sleeve 118 cannot be retracted until the inner radial end of plunger 142 is depressurized (i.e., flow restriction chamber or valve 185 is actuated to the closed position).

Terminal coupler 166 defines an end fitting cavity 168. Terminal coupler 166 comprises a threaded extension 166a, which enables complementary threaded components to couple with terminal coupler 166. More specifically, a tube connecting coupler 100 to a pressurized fluid source (not shown) threads onto threaded extension 166a and supplies fluid into cavity 168. Terminal coupler 166 may be any suitable, shape, configuration or size, depending on the hardware that is desired to be coupled to rapid-connect coupler 100 via terminal coupler 166.

Figure 9:
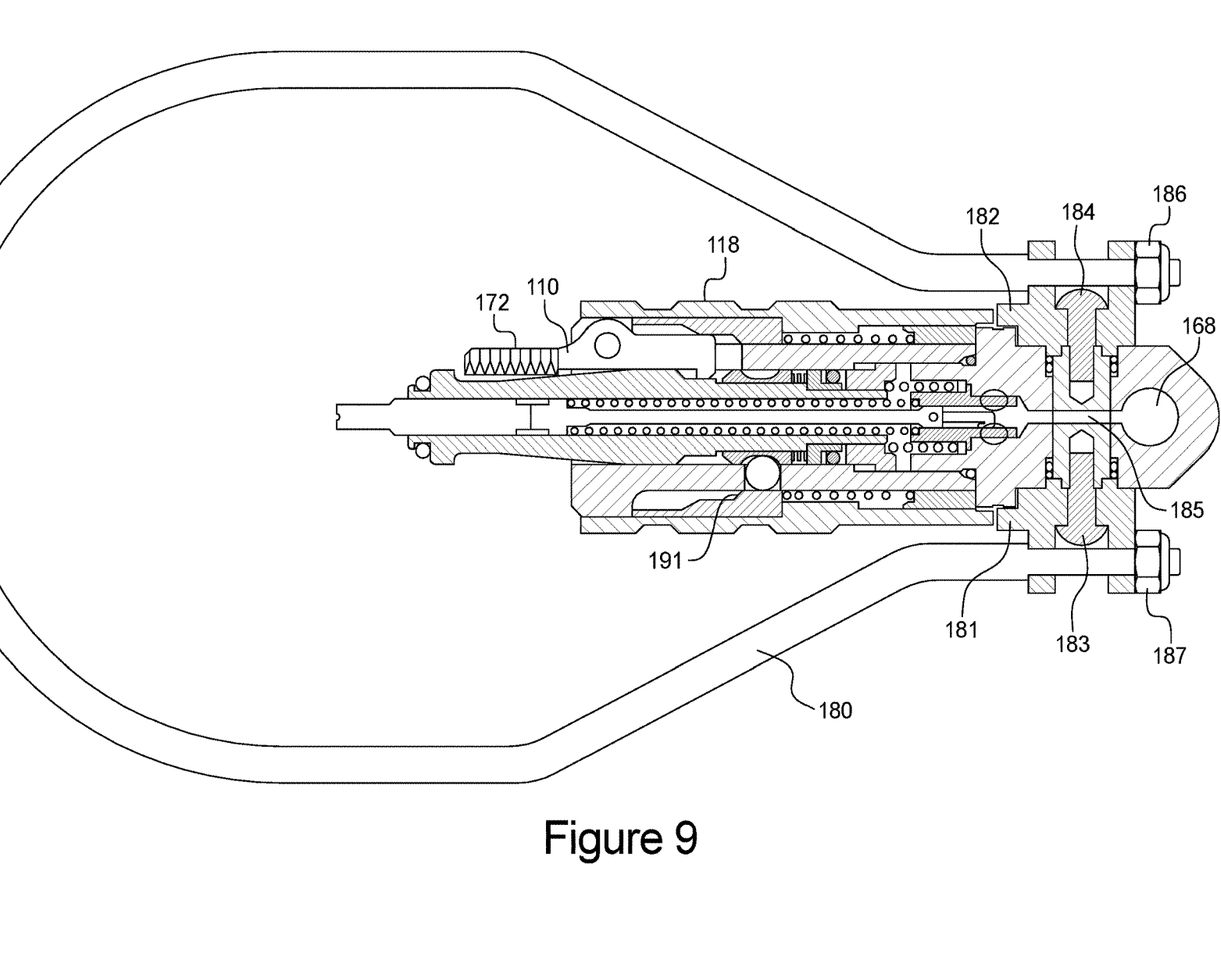
FIG. 9 is a cross sectional top view of the second embodiment of the rapid connect coupler.

FIG. 9 is a top cross-sectional view of rapid-connect coupler 100. Rapid-connect coupler 100 is includes a flow restrictor assembly with a flow restrictor handle 180, first abutment member 181, second abutment member 182, first pin 183, second pin 184, flow restriction chamber or valve 185, first attachment member 186, and second attachment member 187.

First pin 183 and second pin 184 rotatably secure the flow restrictor assembly to end fitting 140 such that portions of the flow restrictor assembly are rotatable around first pin 183 and second pin 184. First pin 183 and second pin 184 enable flow restrictor handle 180 to rotate or actuate flow restriction chamber or valve 185.

First attachment member 186 and second attachment member 187 may be, for example, nuts or similar fasteners that attach flow restrictor handle 180 to the first abutment member 181 and second abutment member 182. Rotation of the flow restrictor handle 180 causes flow restriction chamber or valve 185 to rotate to a plurality of different positions that restrict or enable flow of fluid or product through rapid-connect coupler 100.

FIG. 10 illustrates rapid-connect coupler 100 and refillable receptacle 400. Refillable receptacle 400 may, for example, be a CGA 580 port. Refillable receptacle 400 includes front cavity 410, middle cavity 430, and rear cavity 440, and further includes threaded portion 420 in the front cavity 410. Rapid-connect coupler 100 is configured to couple with refillable receptacle 400 when rapid-connect coupler 100 is inserted into refillable receptacle 400, as described above.

Ball seat 114 is biased by seat spring 116. Biasing of ball seat 114 may be desirable because it provides for improved sealing and coupling of probe 108 within refillable receptacle 400. Biasing of ball seat 114 may prevent a gap from forming between the probe front end 105 and middle cavity 430 of refillable receptacle 400. More specifically, biased ball seat 114 enables probe 108 to move forward (i.e., longitudinally extend) under pressure of gas within the fluid passageway 162 while ball seat 114 stays put. Probe 108 may thereby find and maintain a tight fit against refillable receptacle 400 via packing 106.

Additionally, in various embodiments, tip 102 may be configured to actuate a check-valve or residual pressure valve within refillable receptacle 400 (e.g., within the rear cavity 440). However, in some embodiments, tip 102 may be absent.

The second embodiment of the rapid connect coupler 100 includes a rod assembly configured to open a check valve inside of the receptacle 400. In some cases, the rod assembly of the second embodiment replaces all of tube 160, spring pad 148, tip spring 146, washer 144, front guide 104, and tip 102 of the first embodiment.

The rod assembly is also configured to be exchangeable, such that a user can switch out or exchange one rod assembly for another rod assembly depending on the specific check valve of the receptacle 400. More specifically, a user may be required to refill various different receptacles 400 with a single coupler 100. Each receptacle 400 may include a different check valve. Each check valve may be opened or actuated with a different rod assembly. The rod assembly thus enables a user to tailor the rapid connect coupler 100 to different receptacles.

The rod assembly includes a housing 300, a first generally cylindrical rod 302, a cross pin 303, a rod spring 304, and a second generally cylindrical rod 307. Housing 300 is generally cylindrical and defines a longitudinal groove 301. First rod 302 is attached to cross pin 303. One end of cross pin 303 slides in and tracks groove 301. It should be appreciated that groove 301 serves as a track for cross pin 303. Cross pin 303 stops at both longitudinal ends of groove 301. Some embodiments include a second groove that opposes groove 301 (but is otherwise identical to groove 301). The second groove accommodates the other end of cross pin 303. In some embodiments, housing 300 may longitudinally translate (i.e., extend or retract). In these embodiments, terminal probe spring 138 opposes the extension of housing 300 and biases housing 300 to a retracted position shown in FIG. 4.

First rod 302 contacts second rod 307 at rod interface 306. Second rod 307 includes a tip 308. Tip 308 opens or actuates a check valve of a receptacle 400 (not shown). For example, a check valve may include a hinged door (not shown). A check valve spring may bias the hinged door shut. Tip 308 would oppose the check valve spring and open the hinged door. When tip 308 retracts, the check valve spring would close the hinged door, thus trapping fluid in receptacle 400.

As previously stated, first rod 302 contacts second rod 307 at rod interface 306. More specifically, first rod 302 defines an internal threaded bore. A portion of the outer circumference of second rod 307 defines outer threads. The outer threads of second rod 307 thread into the inner threads of first rod 302. It should thus be appreciated that the threaded outer circumferential portion of second rod 307 extends past interface 306 and into first rod 302. It should be appreciated that the threading may be reversed such that second rod 307 defines the internal threaded bore and first rod 302 defines the outer circumferential threads. First rod 302 and second rod 307 define gaps 305 therebetween. Gaps 305 are optional. In a preferred embodiment, rods 302 and 307 are solid. In other embodiments, rods 302 and 307 may be hollow to enable fluid flow therethrough (not shown).

Flow through probe 108 of second rapid connect coupler will now be described. Fluid or product enters an inner void defined in housing 300 via valve 185. Rod 302 has a square or rectangular cross section. It should be appreciated that the cross sections referred to in the following description are cut in a plane perpendicular to fluid flow and the longitudinal axis of the rapid connect coupler 100. The inner void defined in housing 300 is cylindrical. Thus, fluid flows between the outer surfaces of rod 302 and the inner surfaces housing 300.

When rod 302 narrows, as shown in FIG. 4, the cross section of rod 302 becomes circular. It should thus be appreciated that the portion of rod 302 extending along rod spring 304 is generally cylindrical. In this area, fluid flows between rod 302 and the inner surface of probe 108. Rod 302 widens into a boss 309. Boss 309 centers rod spring 304 between probe 108 and rod 302 such that rod spring 304 can translate in the longitudinal direction but cannot shift in the radial direction.

After boss 309, rod 302 returns to having the square or rectangular cross section. As previously discussed, this portion of rod 302 also defines an inner threaded bore for receiving outer threads of second rod 307. Second rod 307 also has a square or rectangular cross section. Fluid flows between rod 307 and the inner surface of probe 108 into receptacle 400. The cross section of tip 308 varies according to the specific kind of check valve. In one embodiment, tip 308 has a circular cross section. In another embodiment, tip 308 has a square cross section.

It should be appreciated that the square or rectangular cross sections of rods 302 and 307 enable rods 302 and 307 to self-center inside of probe 108. More specifically, outer edges of rods 302 and 307 continuously contact the inner surface of probe 308, thus preventing rods 302 and 307 from flexing under fluid pressure. This can be pictured as a circle tightly encompassing a square. The square contacts the circle at four points. The circle corresponds to the inner surface of probe 308. The square corresponds to rods 302 and 307. The four points correspond to the outer edges of rods 302 and 307. It should be appreciated that rods 302 and 307 can have cross sections other than squares. The rods 302 and 307 may, for example, have any cross section in the form of an equilateral and equiangular polygon.

Rod spring 304 biases rods 302 and 307 to a longitudinally extended position. Force from a check valve opposes rod spring 304, enabling rods 302 and 307 to retract into coupler 100. Eventually, compressive force generated by rod spring 304 overcomes the force from the check valve and rods 302 and 307 extend to open the check valve. Rod 302 and 307 can extend until cross pin 303 reaches the end of groove 301.

Although the rod assembly of FIG. 4 includes two rods, it should be appreciated that two rods are not necessary and that a single rod (or no rod, if the receptacle 400 does not include a check valve) will suffice.

The components of rapid-connect coupler 100 may be made of any suitable material. For example, suitable materials may include, but not be limited to corrosion resistant steel, brass, or the like. Other suitable materials for various components may include nitrile butadiene rubber, polytetrafluoroethylene, or the like.

In various embodiments, rapid-connect coupler 100 may be part of a gas cylinder charging system. For example, rapid-connect coupler 100 may be attached to a tube or hose, which is connected to a pressurized gas source. In some embodiments, a plurality of rapid-connect coupler 100 may be coupled to the pressurized gas source. In such embodiments, pressurized gas cylinders may be rapidly charged either alone or as a group by coupling the one or more rapid-connect coupler 100 to the fill-port of each cylinder and charging the tanks via the pressurized gas source.

As an additional feature, flow restrictor handle 180 may be configured to safely restrain a cylinder or tank that is being re-filled by rapid-connect coupler 100. For example, flow restrictor handle 180 may be configured to loop over and around a portion of refillable receptacle 400 to provide a restraint against free detachment from refillable receptacle 400.

Figure 11:
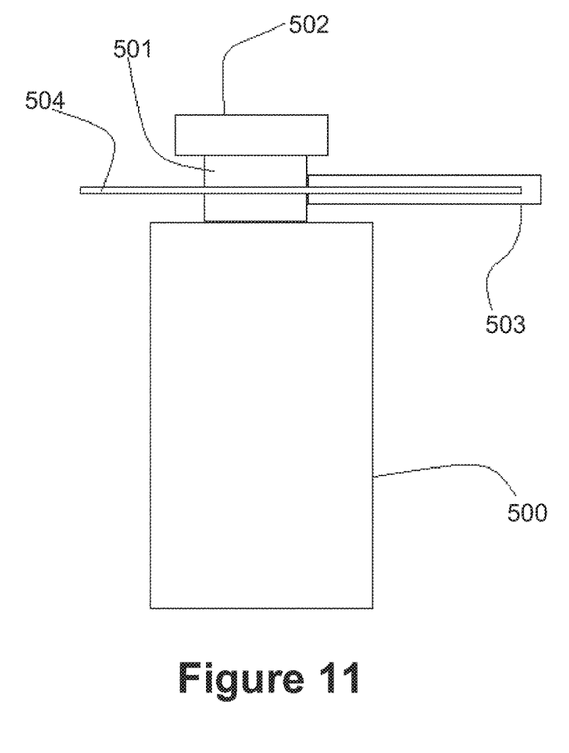
FIG. 11 is a side view of a rapid connect coupler coupled with an exemplary receptacle.

FIG. 11 illustrates this feature. In FIG. 11, a receptacle (such as receptacle 400) includes receptacle body 500, stem 501, and wheel 502. A user twists wheel 502 to open a port fluidly connecting stem 501 to receptacle body 500. A rapid connect coupler 503 (such as rapid connect coupler 100) includes a flow restrictor handle 504 (such as flow restrictor handle 180). Rapid connect coupler 503 is coupled with stem 501 and is delivering fluid or product through stem 501 into receptacle body 500.

As shown in FIG. 11, the user has rotated flow restrictor handle 504 to its fully horizontal position in order to open valve 185. Flow restrictor handle 504 is continuous (except where flow restrictor handle 504 joins rapid connect coupler 503) and loops over stem 501 and wheel 502. If rapid connect coupler 503 decouples from stem 501, fluid or product will flow out of rapid connect coupler 503 toward stem 501, thus propelling coupler 503 backward and away from the receptacle. If this were to happen, flow restrictor handle 504 would contact stem 501 or wheel 502, thus preventing coupler 503 from launching away from the receptacle.

It should be noted that in the description and drawings, like or substantially similar elements may be labeled with the same reference numerals. However, sometimes these elements may be labeled with differing numbers or serial numbers in cases where such labeling facilitates a more clear description. Additionally, the drawings set forth herein are not necessarily drawn to scale, and in some instances proportions may have been exaggerated to more clearly depict certain features. As stated above, this specification is intended to be taken as a whole and interpreted in accordance with the principles of the invention as taught herein and understood by one of ordinary skill in the art.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A rapid-connect coupler comprising:
   an end fitting for conveying a fluid stream;
   a probe for conveying the fluid stream;
   a valve configured to occupy a closed position blocking fluid communication between the probe and the end fitting and an open position enabling fluid communication between the probe and the end fitting;
   a handle configured to actuate the valve between the closed and open positions;
   a sleeve moveable between a first sleeve position and a second sleeve position, wherein the sleeve, in the first sleeve position, is configured to prevent the handle from actuating the valve from the closed position to the open position; and
   a pivoting latch segment defining a threaded section for engaging counter-threads on an inner surface of a receptacle, the pivoting latch segment being pivotable to a first position where the threaded section is inwardly retracted and to a second position where the threaded section is outwardly extended.

2. The coupler of claim 1, wherein the sleeve, in the second sleeve position, is configured to enable the handle to actuate the valve from the closed position to the open position.

3. The coupler of claim 1, wherein the sleeve, in the first sleeve position, is configured to prevent the handle from actuating the valve from the closed position to the open position by physically obstructing movement of the handle.

4. The coupler of claim 1, further comprising a sleeve spring biasing the sleeve to the second sleeve position.

5. The coupler of claim 1, further comprising a retaining member moveable between a blocking position and a clearance position, wherein:
   in the blocking position, the retaining member is configured to counter-bias the sleeve and stop the sleeve in the first sleeve position; and
   in the clearance position, the retaining member is configured to enable the sleeve to transition from the first sleeve position to the second sleeve position.

6. The coupler of claim 5, wherein the retaining member is a spherical ball and the handle is configured to loop over the receptacle.

7. The coupler of claim 1, further comprising a retaining member, a moveable seat, and a seat spring, wherein the moveable seat defines a seat cavity configured to at least partially house the retaining member.

8. The coupler of claim 7, wherein the seat spring biases the moveable seat to an extended position wherein the seat cavity is misaligned with the retaining member.

9. The coupler of claim 8, wherein the moveable seat is configured to occupy a retracted position in which the seat cavity is aligned with the retaining member.

10. The coupler of claim 9, wherein the probe is configured apply a counter-biasing force to the moveable seat, said counter-biasing force opposing a biasing force of the seat spring.

11. The coupler of claim 9, wherein the sleeve is configured to bias the retaining member into the seat cavity when the moveable seat occupies the retracted position.

12. The coupler of claim 1, further comprising a moveable seat and a seat spring, the moveable seat configured to engage the pivoting latch segment and thereby force the pivoting latch segment to occupy the first position.

13. The coupler of claim 12, wherein the sleeve is configured to engage the pivoting latch segment and force the pivoting latch segment to occupy the second position.

14. The coupler of claim 13, wherein the moveable seat defines a seat cavity configured to partially house a retaining member and the moveable seat is configured to occupy a retracted position wherein the seat cavity is aligned with the retaining member.

15. A rapid-connect coupler for use with a receptacle having a receptacle valve disposed therein, the rapid connect coupler comprising:
   a probe for conveying a fluid stream;
   a coupler valve internal to the rapid-connect coupler;
   a sleeve moveable between a first sleeve position and a second sleeve position, wherein when the sleeve is in the first sleeve position, the coupler valve is closed, whereby the probe is prevented from conveying the fluid stream; and
   a pivoting latch segment pivotable between a retracted latch position and an extended latch position, wherein the sleeve, in the second sleeve position, is configured to force the pivoting latch segment into the extended latch position.

16. The coupler of claim 15, further comprising a sleeve spring biasing the sleeve to the second sleeve position and a retaining member moveable between a blocking position and a clearance position; wherein:

in the blocking position, the retaining member is configured to counter-bias the sleeve and stop the sleeve in the first sleeve position; and in the clearance position, the retaining member is configured to enable the sleeve to transition from the first sleeve position to the second sleeve position.

17. A coupler comprising:

a hollow probe for conveying a fluid stream;

a first rod configured to longitudinally translate within the hollow probe;

a second rod joined to the first rod and configured to translate longitudinally within the hollow probe with the first rod, the second rod protruding out of the hollow probe;

a rod spring engaged with the first rod to bias the first and second rods to an extended position;

a pin joined to the first rod and configured to slide in a groove defined in a housing, wherein the groove has an end configured to catch the pin and arrest the longitudinal translation of the first rod.

18. The coupler of claim 17, wherein the second rod is joined to the first rod via a threaded connection.

19. The coupler of claim 18, wherein portions of both the first rod and the second rod have polygonal cross sections that are both equilateral and equiangular, the hollow probe includes an inner surface defining a void with a circular cross section, and the corners of the polygonal cross sections of the portions of the first rod and the second rod contact the inner surface of the hollow probe.

20. The coupler of claim 19, wherein the hollow probe is configured to convey the fluid stream through gaps defined between (a) the polygonal cross sections of the portions of the first rod and the second rod, and (b) the inner surface of the hollow probe.

* * * * *